July 21, 1925.

W. H. MARTIN

DUPLEX SIGNALING SYSTEM

Filed Jan. 17, 1920

1,546,395

INVENTOR.
W. H. Martin
BY
ATTORNEY

Patented July 21, 1925.

1,546,395

UNITED STATES PATENT OFFICE.

WILLIAM H. MARTIN, OF NEW YORK, N. Y., ASSIGNOR TO AMERICAN TELEPHONE AND TELEGRAPH COMPANY, A CORPORATION OF NEW YORK.

DUPLEX SIGNALING SYSTEM.

Application filed January 17, 1920. Serial No. 351,991.

*To all whom it may concern:*

Be it known that I, WILLIAM H. MARTIN, residing at New York, in the county of Bronx and State of New York, have invented certain Improvements in Duplex Signaling Systems, of which the following is a specification.

This invention relates to signal transmitting systems and its object is to increase the flexibility and speed of such systems and more particularly, though not exclusively, such systems when arranged for duplex operation and in which transmission lines of the character found in ocean cables are involved.

Figure 1:
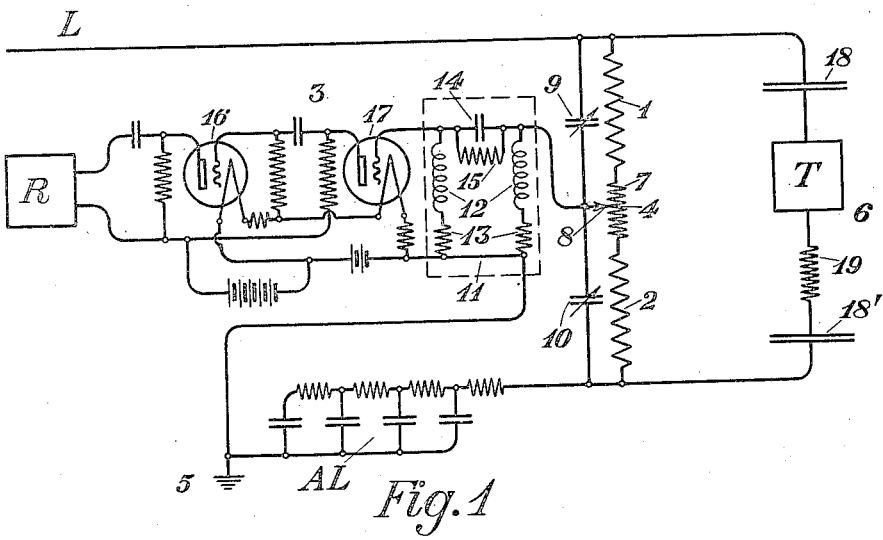
Figure 2:
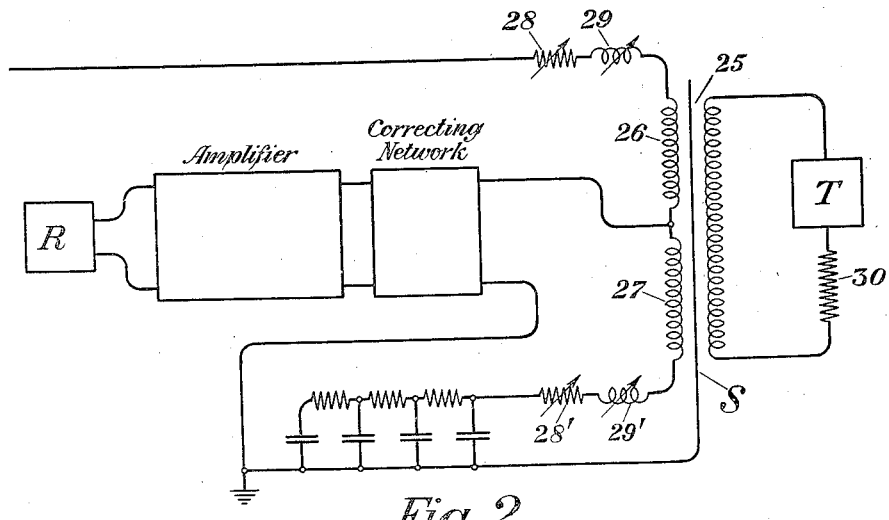

In the accompanying drawings Figure 1 illustrates one embodiment of the invention, and Figure 2 represents a modification.

The arrangement now in general use for duplexing telegraph systems provides a pair of ratio arms connecting the main and artificial lines across which the receiving apparatus is connected and to the apex of which the transmitting apparatus is connected. According to the present invention this relation is inverted. Thus in Figure 1 the transmission line is indicated at L and the artificial line at AL. The ratio arms 1 and 2, here shown as resistances, are connected as usual between the main and artificial lines. The receiving apparatus indicated generally at 3 is connected to the apex 4 of the ratio arms on one side and to ground at 5 on the other side, while the transmitting circuit 6 is connected across the extremities of the ratio arms in the relation commonly occupied by the receiving apparatus. At the junction of the ratio arms a small additional resistance 7 is provided for changing the ratio of the bridge arms; the contact 8 in which one side of the receiving circuit terminates being adjustable for this purpose. Adjustable condensers 9 and 10 are connected across the ratio arms 1 and 2, respectively, for changing the phase angle of the ratio when desired. This can, of course, be done by either inductance or capacity related to the bridge arms in a variety of ways.

The receiving circuit 3 is here shown as comprising the distortion correcting network 11 consisting, in this instance, of two inductances 12 connected across the circuit in series with resistances 13 and a capacity 14 in series with the circuit and shunted by a resistance 15. Any of the known forms of correcting networks may be used. Their effect in general is to increase the steepness of the received wave as applied to the receiving device, thereby increasing possible speed of operation. Between the correcting network 11 and receiving device R are shown two thermionic amplifiers 16 and 17 in tandem whose function it is to increase the amplitude of the received signals to a point where they can be readily and rapidly detected or recorded. These amplifiers are of the well-known type and need no further detailed description.

The transmitter itself is indicated at T. This, of course, includes a source of energy, such as a battery and where the circuit is for use with an ocean cable it will be understood to provide the usual arrangement of contacts whereby the polarity of the impulses can be reversed and zero current signal impulses employed if desired. The condenser commonly used to avoid continuously impressing the voltage of the sending battery on the cable is shown at 18, 18'; being diverted into two parts, one on either side of the transmitter T so as to also protect the circuit from accidental grounding of the battery. The resistance 19 may be connected in circuit with the transmitter for adjusting the shape of the outgoing current wave.

Figure 2 shows a variation of the circuit of Figure 1, in which the transmitting circuit is inductively related to the line by the transformer 25 and the two halves 26, 27 of the secondary of this transformer constitute the ratio arms. Adjustable resistance 28, 28' and adjustable inductance 29, 29' may be connected on either side of the transformer winding 26—27 for adjusting the value of the impedance in the respective arms and the relative phase thereof. S represents a shield of conducting material connected between the primary and secondary of the transformer 25 for eliminating the effect of the capacity between the transformer windings on the balance of the duplex arrangement.

Where the transmitting circuit is connected to the line through a transformer as in Figure 2, the condensers 18, 18' of Figure 1 are unnecessary. A resistance 30 corresponding to resistance 19 of Figure 1 will preferably be included in the transmitting circuit for controlling the character of the transmitted impulses.

By connecting the receiving circuit between the apex of the ratio arms and ground this circuit is more readily adapted to the use of the usual amplifying circuits in which amplifiers of a thermionic type are employed, since, as is well known, the usual forms of this type of amplifier include a grounding of one side of the tube circuits.

It will be understood, of course, that the distortion correcting circuit may be placed at either end of the amplifier circuit or part at one end and part at the other, or interspersed between the stages of the amplifier circuit.

It will be obvious that various modifications in the details of the circuits here illustrated may be made without departing from the spirit of the invention as represented in the appended claims.

What I claim is:

1. A duplex transmission system for handling weak low frequency received signals comprising a line conductor, an artificial line, a pair of ratio arms connected between the line conductor and the artificial line, transmitting mechanism connected across the extremities of the ratio arms and a receiving circuit connected on one side to the apex of said ratio arms and on the other side to ground, said receiving circuit including a thermionic amplifier whose grounded side is connected to the grounded side of said receiving circuit.

2. A duplex transmission system for handling weak low frequency received signals comprising a line conductor, an artificial line, a pair of ratio arms connected between said line conductor and the artificial line, a thermionic amplifier having its input circuit connected on one side to the apex of said ratio arms and on the other side to ground and receiving mechanism connected to the output circuit of said amplifier.

In testimony whereof, I have signed my name to this specification this 15th day of January 1920.

WILLIAM H. MARTIN.